United States Patent [19]

Guttenberger et al.

[11] Patent Number: 5,223,985
[45] Date of Patent: Jun. 29, 1993

[54] DRIVE DEVICE FOR A MOTOR VEHICLE REAR-VIEW MIRROR

[75] Inventors: Richard Guttenberger, Greding; Werner Seichter, Georgensgmund, both of Fed. Rep. of Germany

[73] Assignee: Gebruder Buhler Nachfolger GmbH, Nürnberg, Fed. Rep. of Germany

[21] Appl. No.: 769,385

[22] Filed: Oct. 1, 1991

[30] Foreign Application Priority Data

Oct. 6, 1990 [DE] Fed. Rep. of Germany ....... 4031716

[51] Int. Cl.⁵ .......................... G02B 7/18; B60R 1/02
[52] U.S. Cl. ..................................... 359/872; 359/877
[58] Field of Search ............... 359/871, 872, 873, 874, 359/877; 248/480, 481, 485, 486, 487; 74/89.16

[56] References Cited

U.S. PATENT DOCUMENTS

| | | | |
|---|---|---|---|
| 4,324,454 | 4/1982 | Kumai | 359/877 |
| 4,498,738 | 2/1985 | Kumai | 359/877 |
| 4,598,605 | 7/1986 | Manzoni . | |
| 4,770,522 | 9/1988 | Alten | 359/877 |
| 4,915,493 | 4/1990 | Fisher et al. | 359/877 |
| 4,940,321 | 7/1990 | Yoshida | 359/877 |

FOREIGN PATENT DOCUMENTS

| | | | |
|---|---|---|---|
| 3804137 | 8/1989 | Fed. Rep. of Germany | 359/877 |
| 0179349 | 9/1985 | Japan | 359/877 |

*Primary Examiner*—Bruce Y. Arnold
*Assistant Examiner*—R. D. Shafer
*Attorney, Agent, or Firm*—Mason, Fenwick & Lawrence

[57] ABSTRACT

A drive device for a motor vehicle rear-view mirror comprises a spur gear which may be driven by the shaft of an electric motor, and which is supported by a spherical bearing. The rear-view mirror is carried by a drive plate which is journaled for spherical movement about a spherical seat spaced laterally of the spur gear. A hollow pin extends from said drive plate, being non-rotatably connected for articulation therewith, the hollow pin having external threads. A guide mandrel extends from the spur gear into the hollow pin in sliding relationship, and elastically yieldable snap hooks extend from the spur gear outwardly of the guide mandrel and the hollow pin, and have hook parts for threadedly engaging the threads on the hollow pin.

13 Claims, 1 Drawing Sheet

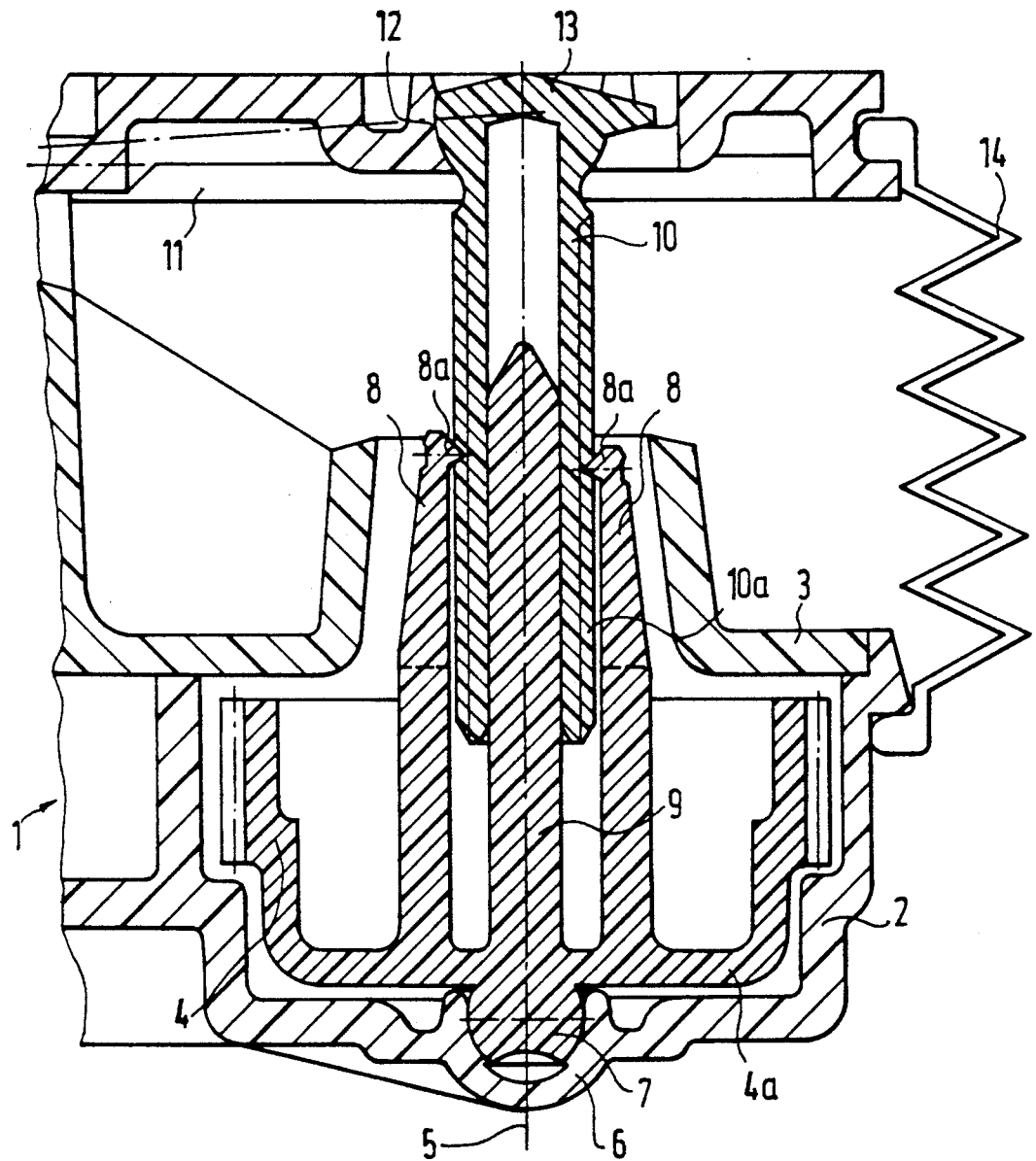

DRIVE DEVICE FOR A MOTOR VEHICLE REAR-VIEW MIRROR

BACKGROUND OF THE INVENTION

The invention relates to a drive device for a motor vehicle rear-view mirror in which at least one electric motor is provided in a housing consisting of an upper part and lower part, the output shaft of said motor meshing drivably with a spur gear mounted rotatably in a single bearing and tiltable within limits, said gear axially moving a nonrotatably mounted adjusting element by means of a threaded area, the free end of said element being coupled for articulation with the mirror support. The single bearing is a part-spherical snap-in seat formed in the lower part of the housing to receive a ball mounted integrally on the underside of the spur gear.

A drive device of this kind is known from Manzoni U.S. Pat. No. 4,598,605. In this known construction, during adjustment of the rear-view mirror, the adjusting element tilts relative to the spur gear, resulting in an increase in the adjusting force required for further rotational movement, and high wear on the threads. The required high retaining force of the single bearing produces an unsatisfactory effect under these conditions because it opposes the following movement of the spur gear into the tilted position of the adjusting element, so that the axes of the adjusting element and spur gear are only aligned in exceptional cases. A further increase in the adjusting force is produced by the large frictional radius (distance of the thread surfaces from the lengthwise axis). In addition, determination of the thread length is difficult in the known construction. Firstly, a degree of axial alignment which is as great as possible between the adjusting element and the spur gear must be produced, necessitating a long thread length, while on the other hand manual adjustment of the rearview mirror must be easy to perform, and this requires a short thread length because of the required provision for external engagement of the thread parts required for this purpose.

The goal of the invention is to provide an improved drive device of the type described so that it requires a lower adjusting force for the upward and downward movement of the adjusting element and ensures easy and always reliable manual adjustment of the rear-view mirror.

SUMMARY OF THE INVENTION

The invention provides in the center of a spur gear an axially extending guide mandrel, which is positioned above the support ball of the spur gear. An adjusting element, in the form of a hollow externally threaded pin, receives the guide mandrel therein and is moved up and down by external thread elements carried by the spur gear which is turned by the shaft of an electric motor.

The attainment of axial alignment is not by the threaded area, as previously provided; instead, it is achieved by the guide mandrel in cooperation with the hollow pin. Therefore, tilting of the system no longer affects the threaded elements. This in turn enables the thread length to be kept very short, facilitating manual adjustment of the rear-view mirror. Finally, assembly is much simpler than in the known construction, because of the assembly based on the guide mandrel.

According to another advantageous feature of the invention, the guide mandrel is integral with the spur gear. This offers advantages in manufacture and assembly.

In an especially advantageous embodiment of the invention, the guide mandrel projects beyond the top of the spur gear and its threaded area. As a result, sufficient guidance is assured even when the hollow threaded pin is in the extended position; in addition, other assembly advantages are provided by the free end of the guide mandrel being conical.

BRIEF DESCRIPTION OF THE DRAWING

The sole figure of the drawing is a cross-sectional view of the preferred embodiment of the invention.

DESCRIPTION OF THE PREFERRED EMBODIMENT

Housing 1 which receives the drive device, of which only a part is shown in the drawing, consists of a shell-like lower part 2 divided into receptacles for the individual drive elements, and an upper part 3 serving primarily as a lid. A spur gear 4 is mounted in the housing, said gear being rotatable around its lengthwise axis 5 and tiltable within limits; in the position shown, spur gear 4 can be tilted or inclined slightly to the right.

The bearing of spur gear 4 is a ball snap seat. For this purpose a spherical seat 6 is formed in lower part 2 of housing 1, into which depression a ball 7, which extends from the center of lower face 4a of spur gear 4 and which is integral therewith, is positioned; ball 7 is mounted with zero play in spherical seat 6. Since lower part 2 of housing 1 and spur gear 4 are injection-molded plastic parts, the one-piece construction of these components with elements 6, 7 of the ball snap seat associated with them poses no difficulties.

Snap hooks 8 project from the inner surface of lower face 4a of spur gear 4. These snap hooks 8 form the segments of an internal thread, with their free ends being staggered heightwise with respect to one another, and with inwardly projecting wise with respect to one another, and with inwardly projecting hook parts 8a; the degree of heightwise staggering depends on the number of elastically yieldable snap hooks 8. Snap hooks 8 surround a coaxial guide mandrel 9 located above ball 7 and extend from the center of spur gear 4, being integral with the spur gear 4.

An adjusting element 10 in the form of a hollow pin is mounted slidably on rotatable guide mandrel 9 and coaxially therewith, and is provided with an external thread 10a into which hook parts 8a of snap hooks 8 engage. The upper part of adjusting element 10 passes through a drive plate 11 in which a spherical depression 12 is formed, the depression 12 receiving head 13 of adjusting element 10 nonrotatably, while permitting articulation of drive plate 11 on element 10. A bellows 14 surrounds the parts that project out of housing 1. The mirror support (not shown) is fastened to drive plate 11. An extension 16 of drive plate 11 is spherical, and rests in a spherical seat 17 of upper part 3 of housing 1; it is held by part spherical retaining head 18.

If the electric drive motor fails, the mirror supported by drive plate 11 may be moved manually, since axial movement of adjusting element 10 will be permitted by yielding of the snap hooks 8.

The claims and the specification describe the invention presented,and the terms that are employed in the claims draw their meaning from the use of such terms in the specification. Some terms employed in the prior art may be broader in meaning than specifically employed herein. Whenever there is a question between the broader definition of such term as used in the prior art and the more specific use of the term herein, the more specific meaning is meant.

What is claimed is:

1. A drive device for a motor vehicle rear-view mirror, comprising:
    a housing comprising an upper part and a lower part,
    a spur gear in said housing,
    means for rotatably supporting said spur gear on said housing and for permitting limited tilting movement thereof,
    a guide mandrel extending axially from said spur gear opposite said supporting means,
    a hollow pin in axial alignment with and slidable on the exterior of said guide mandrel and having external threads thereon,
    means on said spur gear outwardly of said guide mandrel and hollow pin for threadedly engaging said external threads, and
    means on said hollow pin remote from said spur gear for supporting a mirror support for articulation.

2. The device according to claim 1, wherein said guide mandrel is integral with said spur gear.

3. The device according to claim 2, said spur gear having a surface opposite to said supporting means, and wherein said guide mandrel projects beyond said surface of the spur gear, the teeth of said spur gear, and said means for engaging said external threads.

4. The device according to claim 3, wherein said guide mandrel has a free conical end remote from said spur gear.

5. The device according to claim 1, and further comprising a drive plate, and means for connecting said drive plate and said hollow pin for non-rotational and articulated movement.

6. The device according to claim 5, and further comprising means spaced from said hollow pin for supporting said drive plate for rotational movement.

7. The device according to claim 1, wherein said means on said spur gear comprise elastically yieldable snap hooks.

8. The device according to claim 1, said spur gear having a surface opposite to said supporting means, and wherein said guide mandrel projects beyond said surface of the spur gear, the teeth of said spur gear, and said means for engaging said external threads.

9. The device according to claim 8, wherein said guide mandrel has a free conical end remote from said spur gear.

10. A drive device for a motor vehicle rear-view mirror, comprising:
    a housing comprising an upper part and a lower part,
    a spur gear in said housing having a part spherical bearing element thereon,
    single bearing means for rotatably supporting said spur gear on said housing and for permitting limited tilting movement thereof comprising a snap seat in the lower part of the housing receiving said part spherical bearing element,
    a guide mandrel extending axially from said spur gear opposite said part spherical bearing element,
    a mirror support in spaced relation to said guide mandrel,
    a hollow pin having a free end,
    means on the free end of said hollow pin for pivotally and non-rotatably coupling said hollow pin to said mirror support,
    said hollow pin being substantially in axial alignment with and slidable on the exterior surface of said guide mandrel and having external threads thereon, and
    means on said spur gear outwardly of said guide mandrel and hollow pin for threadedly engaging said external threads,
    whereby rotation of said spur gear causes axial, non-rotating movement of said hollow pin while being guided by said guide mandrel and whereby said spur gear and hollow pin may tilt on said single bearing means.

11. The device according to claim 10, wherein said guide mandrel is integral with said spur gear.

12. The device according to claim 11, said spur gear having a surface opposite to said bearing element, and wherein said guide mandrel projects beyond said surface of the spur gear, the teeth of said spur gear, and said means for engaging said external threads.

13. The device according to claim 12, wherein said guide mandrel has a free conical end remote from said spur gear.

* * * * *